(12) United States Patent
Bourisaw

(10) Patent No.: US 9,781,908 B1
(45) Date of Patent: Oct. 10, 2017

(54) AERATION FITTING FOR AN AQUARIUM

(71) Applicant: Gary Bourisaw, Ste. Genevieve, MO (US)

(72) Inventor: Gary Bourisaw, Ste. Genevieve, MO (US)

( * ) Notice: Subject to any disclaimer, the term of this patent is extended or adjusted under 35 U.S.C. 154(b) by 0 days.

(21) Appl. No.: 15/162,356

(22) Filed: May 23, 2016

(51) Int. Cl.
*F16K 15/04* (2006.01)
*A01K 63/04* (2006.01)
*A01K 63/00* (2017.01)
*F16L 55/07* (2006.01)

(52) U.S. Cl.
CPC .......... *A01K 63/042* (2013.01); *A01K 63/006* (2013.01); *F16K 15/044* (2013.01); *F16L 55/07* (2013.01)

(58) Field of Classification Search
CPC ...... F16K 15/044; F16L 55/07; A01K 63/006; A01K 63/042
USPC .... 137/515, 515.5, 533.11, 539, 540, 543.17
See application file for complete search history.

(56) References Cited

U.S. PATENT DOCUMENTS

| | | | | |
|---|---|---|---|---|
| 2,018,769 A | * | 10/1935 | Tryon | F16K 15/04 137/515.7 |
| 3,498,315 A | * | 3/1970 | Hester | F16K 15/04 137/375 |
| 4,196,695 A | | 4/1980 | Zupo | |
| 4,674,529 A | * | 6/1987 | Ferguson | F16K 15/04 137/375 |
| 4,728,420 A | | 3/1988 | Abercia, Jr. | |
| 4,927,568 A | | 5/1990 | Campau | |

* cited by examiner

*Primary Examiner* — Craig Schneider
*Assistant Examiner* — P. Macade Nichols
(74) *Attorney, Agent, or Firm* — Stevenson IP, LLC

(57) ABSTRACT

An aeration fitting for an aquarium including a hollow outer fitting having an interior channel, a cylindrical back portion, a cylindrical front portion having a threaded outer surface, a tapered cylindrical middle portion, and a frontwardly flared outer lip. A floating ball is disposed within the interior channel of the outer fitting. A hollow inner fitting has an inner channel, a cylindrical posterior portion, a cylindrical anterior portion having a threaded inner surface, a tapered cylindrical central portion, and a frontwardly flared inner lip. A spring is disposed within the inner channel of the inner fitting. Each of the back portion of the outer fitting and the posterior portion of the inner fitting is connectable to an air hose, and the threaded outer surface of the front portion is selectively engageable with the threaded inner surface of the anterior portion within an aperture in a wall of an aquarium.

2 Claims, 5 Drawing Sheets

AERATION FITTING FOR AN AQUARIUM

BACKGROUND OF THE INVENTION

Various types of aquarium aerators are known in the prior art. However, what has been needed is an aeration fitting for an aquarium including a hollow outer fitting having an interior channel, a cylindrical back portion, a cylindrical front portion having a threaded outer surface, a tapered cylindrical middle portion, and a frontwardly flared outer lip. A floating ball is disposed within the interior channel of the outer fitting. What has been further needed is a hollow inner fitting having an inner channel, a cylindrical posterior portion, a cylindrical anterior portion having a threaded inner surface, a tapered cylindrical central portion, and a frontwardly flared inner lip. A spring is disposed within the inner channel of the inner fitting. Lastly, what has been needed is for each of the back portion of the outer fitting and the posterior portion of the inner fitting to be connectable to an air hose, and for the threaded outer surface of the front portion to be selectively engageable with the threaded inner surface of the anterior portion within an aperture in a wall of an aquarium. The aeration fitting for an aquarium thus helps to protect an air hose from being disturbed and displaced by fish swimming in the aquarium, since it can be hid from view and run under the gravel layer at the bottom of the aquarium. The hiding of the air hose at the bottom of the aquarium not only helps to decrease the maintenance needed on the aquarium, but also results in a more visually pleasing aquarium by eliminating the need to run an air hose from the top of the aquarium into the water.

FIELD OF THE INVENTION

The present invention relates to aquarium aerators, and more particularly, to an aeration fitting for an aquarium.

SUMMARY OF THE INVENTION

The general purpose of the present aeration fitting for an aquarium, described subsequently in greater detail, is to provide an aeration fitting for an aquarium which has many novel features that result in an aeration fitting for an aquarium which is not anticipated, rendered obvious, suggested, or even implied by prior art, either alone or in combination thereof.

To accomplish this, the present aeration fitting for an aquarium includes a single continuous hollow outer fitting having a single continuous interior channel, a cylindrical back portion, a cylindrical front portion having a threaded outer surface, a tapered cylindrical middle portion disposed between the back portion and the front portion, and a frontwardly flared outer lip continuously disposed around an entirety of a circumference of the outer fitting between the middle portion and the front portion. Each of the back portion, the front portion, and the middle portion have a front end and back end. A diameter of the back portion of the outer fitting is greater than a diameter of the back end of the middle portion of the outer fitting. The diameter of the back end of the middle portion of the outer fitting is less than a diameter of the front end of the middle portion of the outer fitting. A diameter of the interior channel of the outer fitting proximal the front end of the front portion is greater than a diameter of the interior channel of the outer fitting proximal the back end of the back portion. A floating ball is moveably disposed within the interior channel of the outer fitting proximal the front end of the front portion. A diameter of the floating ball is optionally 0.3175 cm (0.125 inches).

A single continuous hollow inner fitting has a single continuous inner channel, a cylindrical posterior portion, a cylindrical anterior portion having a threaded inner surface, a tapered cylindrical central portion disposed between the posterior portion and the anterior portion, and a frontwardly flared inner lip continuously disposed around an entirety of a circumference of the inner fitting between the central portion and the anterior portion, wherein each of the posterior portion, the anterior portion, and the central portion has an anterior end and a posterior end. A diameter of the posterior portion of the inner fitting is greater than a diameter of the posterior end of the central portion of the inner fitting. The diameter of the posterior end of the central portion of the inner fitting is less than a diameter of the anterior end of the central portion of the inner fitting. A diameter of the inner channel of the inner fitting proximal the anterior end of the anterior portion is greater than a diameter of the inner channel of the inner fitting proximal the posterior end of the posterior portion. A spring is disposed within the inner channel of the inner fitting proximal the anterior end of the anterior portion.

Each of the back portion of the outer fitting and the posterior portion of the inner fitting is removably connectable to an air hose. The inner lip of the inner fitting is removably disposed on an interior surface of a wall of an aquarium and the outer lip of the outer fitting is removably disposed on an exterior surface of the wall of the aquarium. Each of the anterior portion of the inner fitting and the front portion of the outer fitting is disposed within an aperture disposed through the wall of the aquarium such that the threaded outer surface of the front portion is selectively engageable with the threaded inner surface of the anterior portion within the aperture. The air hose connected to the back portion of the outer fitting is configured to be connectable to an air pump in order to transport air from the outer fitting through the inner fitting disposed within the aquarium.

The spring disposed within the inner channel of the inner fitting is structured to prevent the floating ball from restricting air flow during operation. However, the spring is structured to force the floating ball into the interior channel of the outer fitting when the air pump malfunctions or an electrical outage occurs in order to prevent water drainage from the aquarium. The disposition of each of the outer lip and the inner lip against the interior surface and the exterior surface, respectively, of the wall of the aquarium is structured to create an airtight seal to facilitate the transfer of air into the aquarium through the outer fitting and the inner fitting.

Thus has been broadly outlined the more important features of the present aeration fitting for an aquarium so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
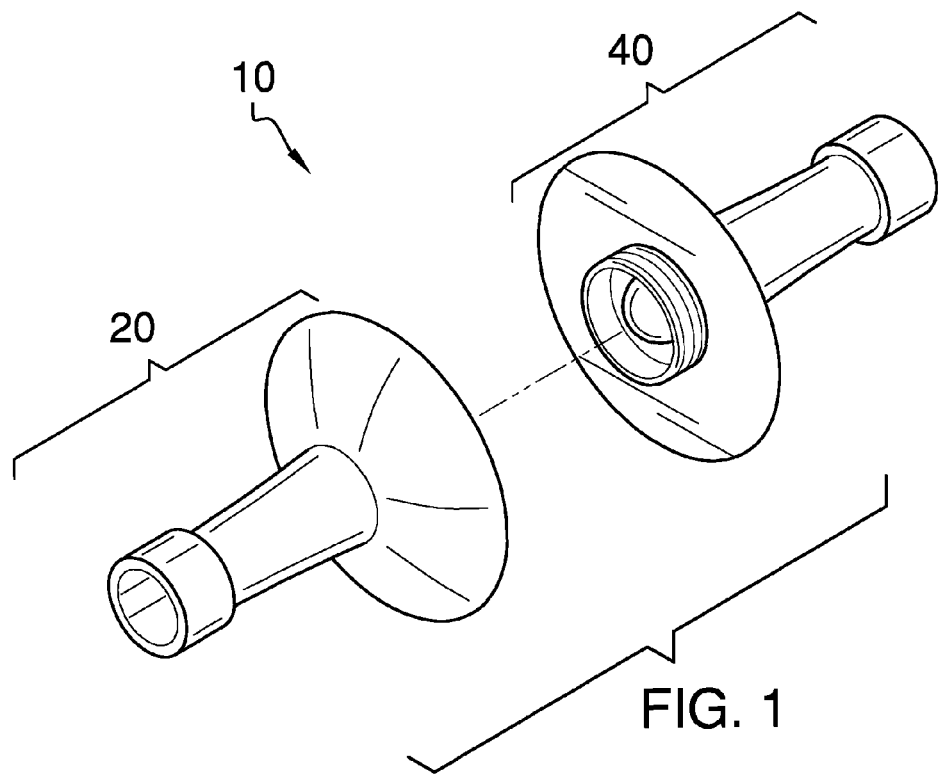
FIG. 1 is a front isometric view.
Figure 2:
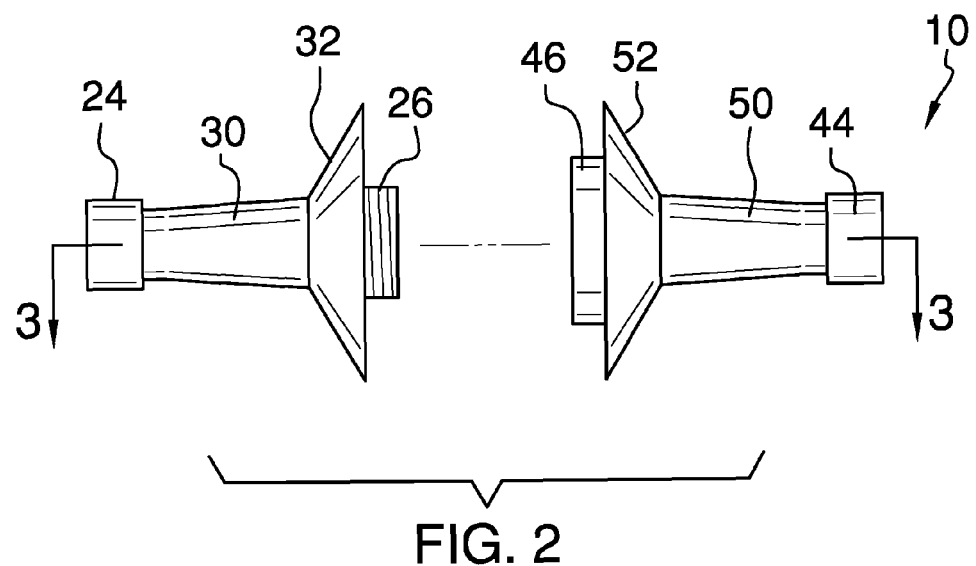
FIG. 2 is a side elevation view.
Figure 3:
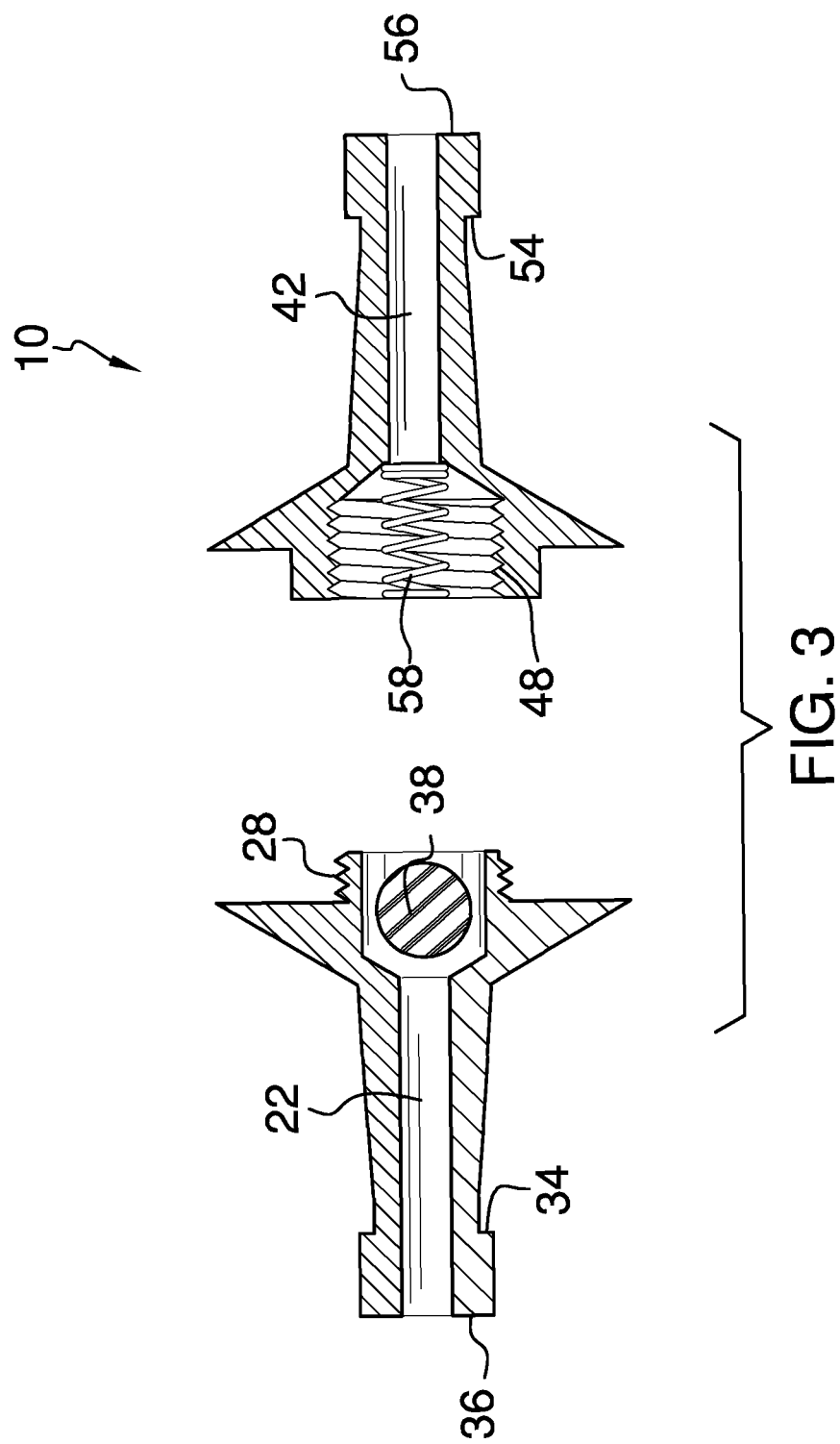
FIG. 3 is a cross-sectional view taken along line 3-3 of FIG. 2.
Figure 4:
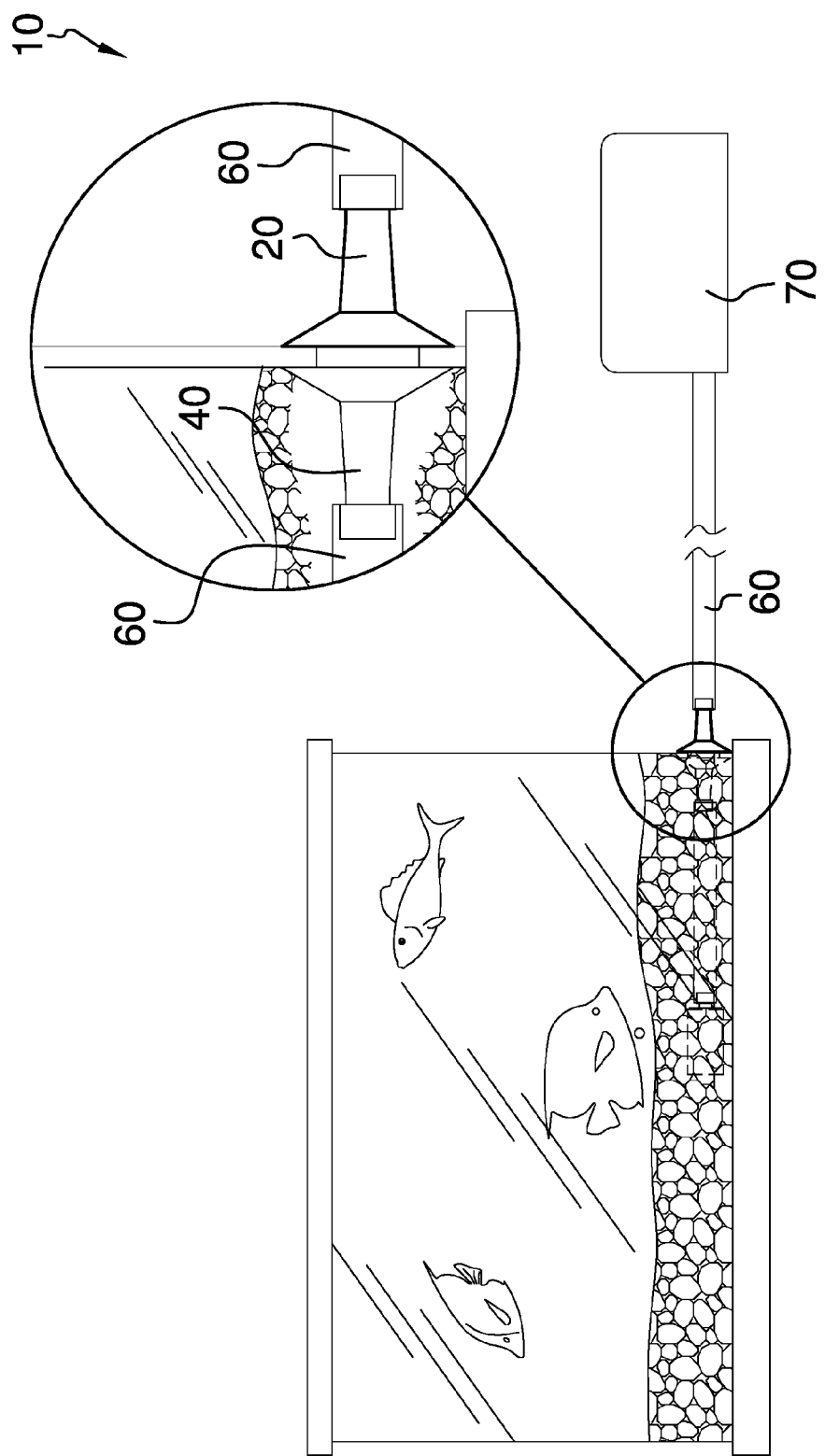
FIG. 4 is an in-use side elevation view.
Figure 5:
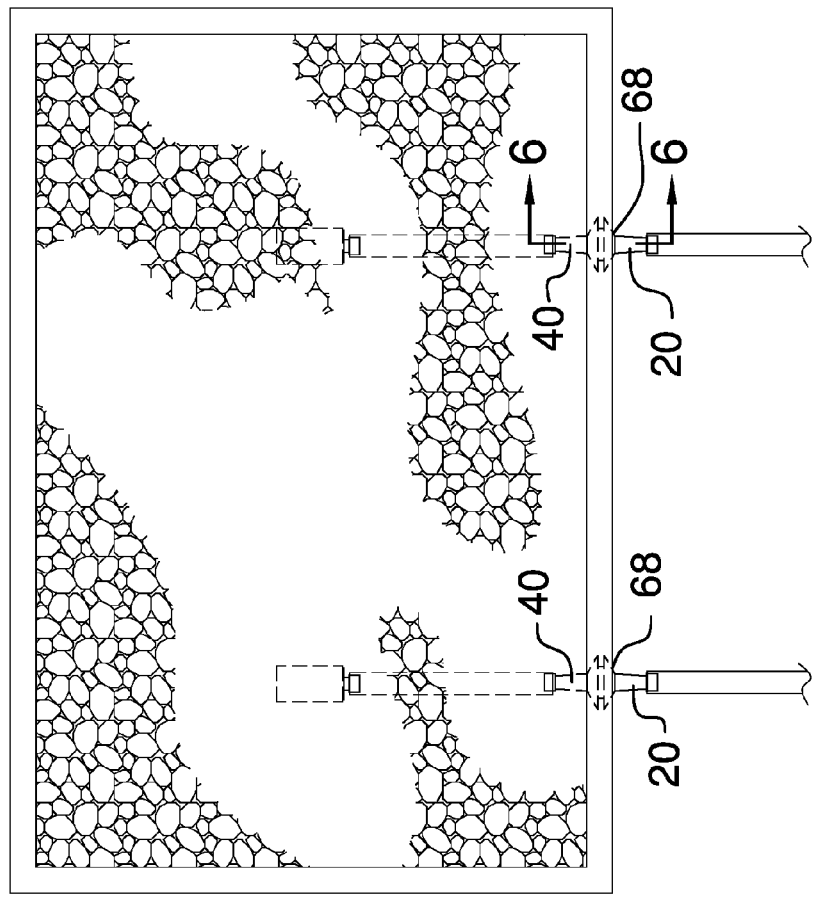
FIG. 5 is an in-use top plan view.
Figure 6:
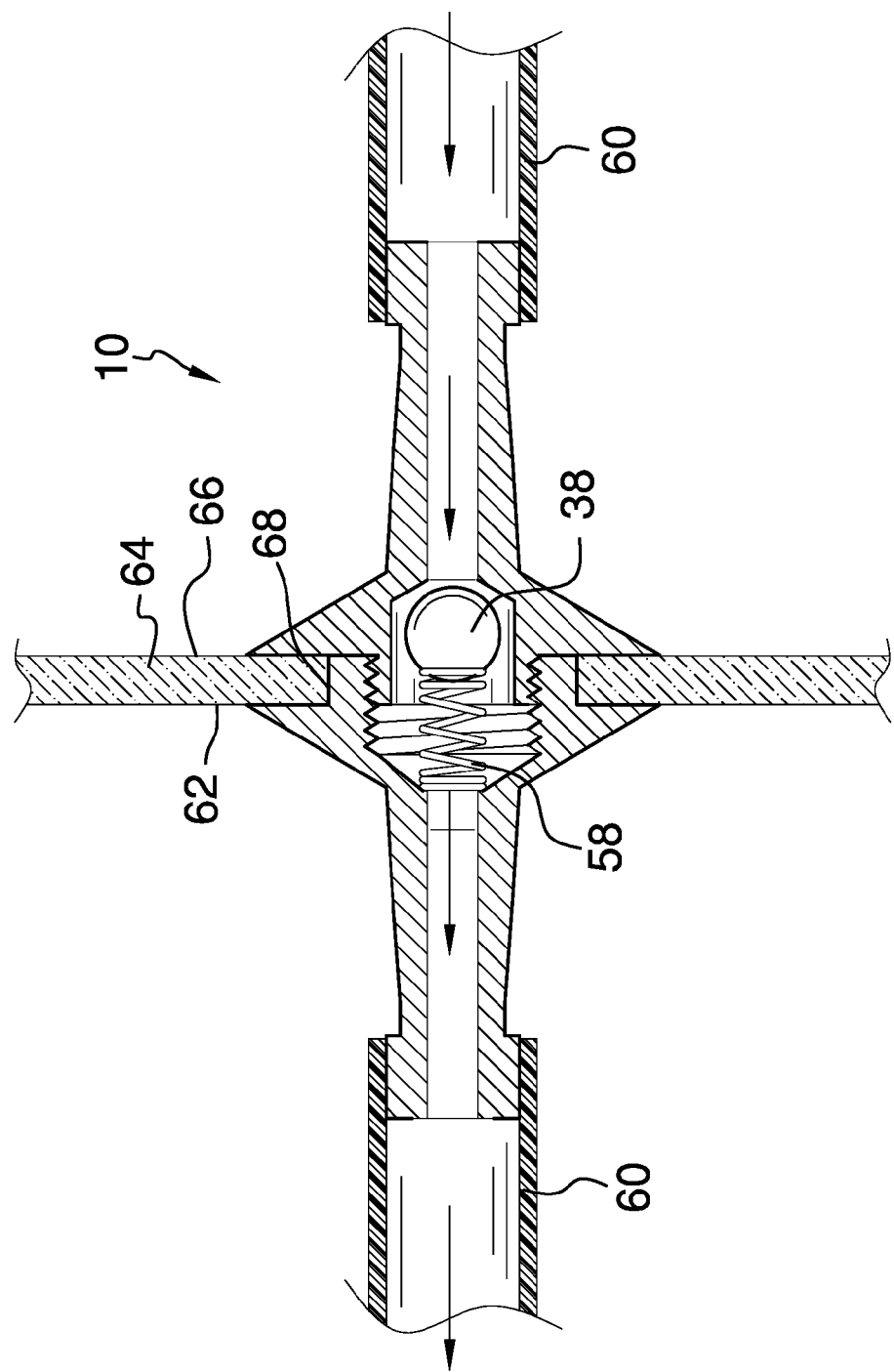
FIG. 6 is a cross-sectional view taken along line 6-6 of FIG. 5.

With reference now to the drawings, and in particular FIGS. 1 through 6 thereof, an example of the instant aeration fitting for an aquarium employing the principles and concepts of the present aeration fitting for an aquarium and generally designated by the reference number 10 will be described.

Referring to FIGS. 1 through 6 the present aeration fitting for an aquarium 10 is illustrated. The aeration fitting for an aquarium 10 includes a single continuous hollow outer fitting 20 having a single continuous interior channel 22, a cylindrical back portion 24, a cylindrical front portion 26 having a threaded outer surface 28, a tapered cylindrical middle portion 30 disposed between the back portion 24 and the front portion 26, and a frontwardly flared outer lip 32 continuously disposed around an entirety of a circumference of the outer fitting 20 between the middle portion 30 and the front portion 26. Each of the back portion 24, the front portion 26, and the middle portion 30 have a front end 34 and back end 36. A floating ball 38 is moveably disposed within the interior channel 22 of the outer fitting 20 proximal the front end 34 of the front portion 26.

A single continuous hollow inner fitting 40 has a single continuous inner channel 42, a cylindrical posterior portion 44, a cylindrical anterior portion 46 having a threaded inner surface 48, a tapered cylindrical central portion 50 disposed between the posterior portion 44 and the anterior portion 46, and a frontwardly flared inner lip 52 continuously disposed around an entirety of a circumference of the inner fitting 40 between the central portion 50 and the anterior portion 46, wherein each of the posterior portion 44, the anterior portion 46, and the central portion 50 has an anterior end 54 and a posterior end 56. A spring 58 is disposed within the inner channel 42 of the inner fitting 40 proximal the anterior end 54 of the anterior portion 46.

Each of the back portion 24 of the outer fitting 20 and the posterior portion 44 of the inner fitting 40 is removably connectable to an air hose 60. The inner lip 52 of the inner fitting 40 is removably disposed on an interior surface 62 of a wall of an aquarium 64 and the outer lip 32 of the outer fitting 20 is removably disposed on an exterior surface 66 of the wall of the aquarium 64. Each of the anterior portion 46 of the inner fitting 40 and the front portion 26 of the outer fitting 20 is disposed within an aperture 68 disposed through the wall of the aquarium 64 such that the threaded outer surface 28 of the front portion 26 is selectively engageable with the threaded inner surface 48 of the anterior portion 46 within the aperture 68. The air hose 60 connected to the back portion 24 of the outer fitting 20 is configured to be connectable to an air pump 70 in order to transport air from the outer fitting 20 through the inner fitting 40 disposed within the aquarium.

What is claimed is:
1. An aeration fitting for an aquarium comprising:
a single continuous hollow outer fitting having a single continuous interior channel, a cylindrical back portion, a cylindrical front portion having a threaded outer surface, a tapered cylindrical middle portion disposed between the back portion and the front portion, and a frontwardly flared outer lip continuously disposed around an entirety of a circumference of the outer fitting between the middle portion and the front portion, wherein each of the back portion, the front portion, and the middle portion have a front end and back end;
wherein a diameter of the back portion of the outer fitting is greater than a diameter of the back end of the middle portion of the outer fitting;
wherein the diameter of the back end of the middle portion of the outer fitting is less than a diameter of the front end of the middle portion of the outer fitting;
wherein a diameter of the interior channel of the outer fitting proximal the front end of the front portion is greater than a diameter of the interior channel of the outer fitting proximal the back end of the back portion;
a floating ball moveably disposed within the interior channel of the outer fitting proximal the front end of the front portion;
a single continuous hollow inner fitting having a single continuous inner channel, a cylindrical posterior portion, a cylindrical anterior portion having a threaded inner surface, a tapered cylindrical central portion disposed between the posterior portion and the anterior portion, and a frontwardly flared inner lip continuously disposed around an entirety of a circumference of the inner fitting between the central portion and the anterior portion, wherein each of the posterior portion, the anterior portion, and the central portion has an anterior end and a posterior end;
wherein a diameter of the posterior portion of the inner fitting is greater than a diameter of the posterior end of the central portion of the inner fitting;
wherein the diameter of the posterior end of the central portion of the inner fitting is less than a diameter of the anterior end of the central portion of the inner fitting;
wherein a diameter of the inner channel of the inner fitting proximal the anterior end of the anterior portion is greater than a diameter of the inner channel of the inner fitting proximal the posterior end of the posterior portion; and
a spring disposed within the inner channel of the inner fitting proximal the anterior end of the anterior portion;
wherein each of the back portion of the outer fitting and the posterior portion of the inner fitting is removably connectable to an air hose;
wherein the inner lip of the inner fitting is removably disposed on an interior surface of a wall of an aquarium and the outer lip of the outer fitting is removably disposed on an exterior surface of the wall of the aquarium;
wherein each of the anterior portion of the inner fitting and the front portion of the outer fitting is disposed within an aperture disposed through the wall of the aquarium such that the threaded outer surface of the front portion is selectively engageable with the threaded inner surface of the anterior portion within the aperture;
wherein the air hose connected to the back portion of the outer fitting is configured to be connectable to an air pump in order to transport air from the outer fitting through the inner fitting disposed within the aquarium.
2. The aeration fitting for an aquarium of claim 1 wherein a diameter of the floating ball is 0.125 inches.

* * * * *